F. CONRAD.
GEAR WHEEL.
APPLICATION FILED JULY 2, 1913.

1,167,742.

Patented Jan. 11, 1916.

WITNESSES:
Fred H. Miller
J. P. Langley

INVENTOR
Frank Conrad
BY
Wesley G. Carr
ATTORNEY

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

GEAR-WHEEL.

1,167,742.　　　　　Specification of Letters Patent.　　Patented Jan. 11, 1916.

Application filed July 2, 1913. Serial No. 776,951.

*To all whom it may concern:*

Be it known that I, FRANK CONRAD, a citizen of the United States, and a resident of Swissvale, in the county of Allegheny and State of Pennsylvania, have invented a new and useful Improvement in Gear-Wheels, of which the following is a specification.

My invention relates to gear wheels and particularly to such wheels as are composed of non-metallic materials.

My invention has for its object to provide a gear wheel which is light, strong and durable in construction and noiseless in operation.

Gear wheels of non-metallic materials, as heretofore constructed, have ordinarily been composed of materials having a low tensile strength and a comparatively short life. Other disadvantages that may be noted are an absence of elasticity of the gear teeth and a lack of heat and moisture-resisting qualities in the material composing the gear wheels.

My invention consists broadly in constructing a gear wheel of a material which is light, strong and durable and, in addition, possesses the qualities of being infusible and impervious to moisture and most chemicals.

My invention will be described in connection with the accompanying drawings in which—

Figure 1:
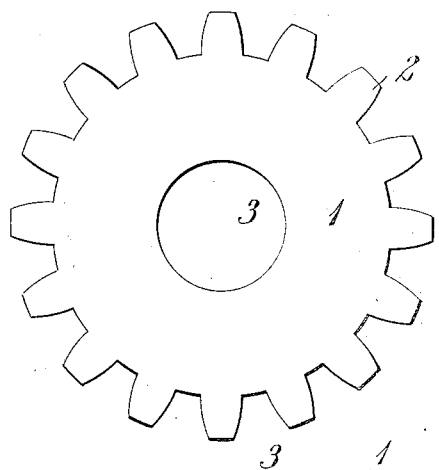
Figure 2:
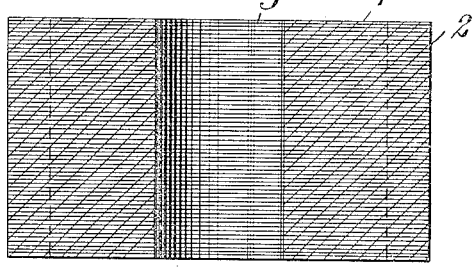
Figure 3:
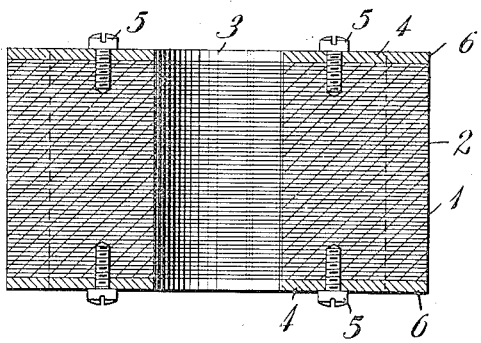

Figure 1 is an end view of a gear wheel constructed in accordance with my invention. Fig. 2 is a sectional view of the same. Fig. 3 is a view, similar to Fig. 2, of a modification of my invention.

Referring particularly to Figs. 1 and 2, a gear wheel 1 is provided with suitable teeth 2 and with a central opening or bore 3. The material of which the gear wheel 1 is constructed and the process of making the same will now be described. The material may be any suitable fabric such as paper, muslin, or other cloth, or fibrous or porous material of any kind. The fabric is first coated on one side, in any suitable manner, with an adhesive liquid material, for example, preferably a phenolic condensation product such as bakelite, which is a condensation product of phenols and formaldehyde. The paper is next dried by passing it over a series of rollers in a heated oven. The prepared paper is then cut into sheets of a convenient size. A plate is built up by placing the sheets together with the untreated side of each sheet next to the treated side of the adjacent sheet, the number of sheets required for any given thickness having been previously determined. The built-up plate is then placed between thin sheet steel plates and the assembled structure is placed between the platens of a hydraulic press which have been previously heated. Pressure is then applied and the plates are heated while in the press. The amount of pressure and the degree of heat applied may be varied in accordance with conditions. The effect of heating and pressing the plate is to firmly cement together the sheets of paper and to further impregnate the paper with the bakelite. The plate is transformed into a hard, compact and coherent mass. After cooling, the plates of material are removed from the press and then clamped between steel plates to prevent warping during baking, which is the last step in the process. The plates are next placed in ovens and heat is applied for several hours, during which time any remaining moisture is expelled and the bakelite is transformed into its solid, infusible and insoluble condition. The plates are then removed from the oven and the finished product is allowed to cool. The resultant material has a specific gravity of approximately 1.25. It is practically non-absorbent, even when soaked in hot water and is insoluble. Consequently, there is no tendency for any given structure of this material to change its dimensions when subjected to moisture or atmospheric conditions. The substance will withstand a constant temperature of 150° C. without deterioration and up to 300° C., if temporary. The tensile strength of this material is approximately 20,000 pounds per square inch, which exceeds that of wood, fiber, and other similar materials. The material is also very hard and can be turned and bored in the same manner as wood. The finished plates are then cut into blanks of any desired size and the teeth are cut in the usual manner employed in the manufacture of metal or other gear wheels.

A modification of my invention is shown in Fig. 3 in which like numbers indicate corresponding parts. The gear wheel 1 is constructed from the same material and in the same manner as that shown in Figs. 1 and 2 except that metal plates or shrouds 4 cover the ends of the wheel. The plates, which are fastened to the paper and bakelite structure by screws 5, are provided with teeth 6 which register with those on the body of the gear wheel. The purpose of the plates 4 is to protect the edges of the composite structure from injury and to give added strength to the wheel.

The present gear possesses a combination of qualities and characteristics that are not found in any other gear, and, accordingly, it has a larger field of use and application than any other. It is not only much more quiet in operation than metal gears, being substantially noiseless, but it resists wear to such a degree that, for many kinds of service, it has been found very much more durable than metal gears. Moreover, it does not require lubrication unless the service is severe. It is also strong and tough and its teeth possess a certain degree of elasticity, with the result that the teeth are seldom or never broken, as are those of metal gears.

Previous gears made of laminated and fibrous materials have required the use of end plates or other similar means for clamping the materials together and for preventing distortion of the gears, but such clamping means are not necessary with the present gear because the layers and fibers are so securely cemented, and adhere together so strongly, that the gear is entirely self-sustaining and coherent. However, end plates may be employed if additional strength is desired.

In the appended claims, the term "self-sustaining" is intended to describe that property of applicant's composite gears which renders them capable of being formed, handled and operated in all respects like gears made of metal or other single material, without the use of end-plates or other clamping means.

Because end plates are unnecessary, the present gear may be shorter, for a given length of bearing surface of the laminated or fibrous material in the teeth, than where plates are required. It may, accordingly, be employed where the space is limited, or where other conditions are such that previous gears made largely of laminated or fibrous materials could not be used. Furthermore, the use of end plates in previous gears has also involved the use of clamping rivets or bolts extending longitudinally through the gears. Rivets and bolts occupy radial space, and, accordingly, the present gear may be made in smaller diameters than previous gears made of fibrous or laminated materials. In fact, the present gear occupies no greater longitudinal and diametral space than a metal gear. The present gear is also distinguished from other gears made from fibrous or laminated materials in that it is so resistant to wear as not to require the use of intermediate metal plates for the purpose of rendering it sufficiently durable. Furthermore, being oil and moisture proof and resistant to heat, it does not deteriorate or become warped and distorted in use, as do such materials as raw hide, leather, hard fiber, etc.

To summarize, the present gear is substantially noiseless in operation, highly resistant to wear, self-lubricating to a considerable degree, tough, strong, elastic, and self-sustaining,—a combination of qualities not heretofore possessed by any gear.

Any adhesive material is equivalent to phenolic condensation products for the purpose of my invention which will produce a firm, self-sustaining and wear-resisting gear, and which will not be deleteriously affected by operating conditions.

It is to be understood that such changes and modifications may be made in my invention without departing from the spirit of my invention as fall within the limits of the appended claims.

I claim as my invention:

1. A self-sustaining gear composed of fibrous material and a binder.
2. A self-sustaining gear composed of laminations of fibrous material and a binder.
3. A gear having a self-sustaining working body portion composed of laminations of fibrous material and a binder comprising a phenolic condensation product.
4. A gear having a self-sustaining working body portion composed of a fibrous material, and a binder that resists attack by heat, oil or water, under operating conditions.
5. A gear having a self-sustaining working body portion composed of fibrous material, and a binder that is unimpaired by operating temperatures.
6. A gear having a self-sustaining working body portion composed of laminations of a fibrous material cemented together by means of a binder that is unimpaired by heat, oil or water under operating conditions.
7. A gear having a self-sustaining working body portion composed of fibrous material and a phenolic condensation product.
8. A gear having a self-sustaining working body portion composed of laminations of a fibrous material and a phenolic condensation product.
9. A gear having a self-sustaining working body portion composed of fibrous material and a binder.
10. A gear having a self-sustaining working body portion composed of laminations of fibrous material and a binder.
11. A gear having a self-sustaining working body portion composed of fibrous textile material and a binder.
12. A gear having a self-sustaining working body portion composed of fibrous textile material and a binder that resists attack by heat, oil or water, under operating conditions.

13. A gear having a self-sustaining working body portion composed of fibrous textile material and a binder that is unimpaired by operating temperatures.

14. A gear having a self-sustaining working body portion composed of fibrous textile material and a phenolic condensation product.

In testimony whereof, I have hereunto subscribed my name this 28th day of June 1913.

FRANK CONRAD.

Witnesses:
C. A. ATHERTON,
B. B. HINES.